Aug. 5, 1969  V. K. WALWORTH  3,459,553
PHOTOSENSITIVE ELEMENTS
Filed Oct. 11, 1965

FIG. 1

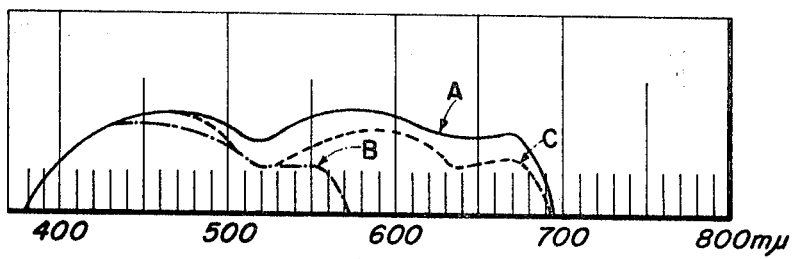

A- Anhydro-11-methyl-3,3'-bis-(ɣ-sulfopropyl)-
 naphtho-[1,2-d]-thiacarbocyanine hydroxide
 plus anhydro-3,3'-bis-(ɣ-sulfopropyl)-naphtho-
 [1,2-d]-oxacarbocyanine hydroxide
B- Anhydro-3,3'-bis-(ɣ-sulfopropyl)-naphtho
 [1,2-d]-oxacarbocyanine hydroxide
C- Anhydro-11-methyl-3,3'-bis-(ɣ-sulfopropyl)-
 naphtho-[1,2-d]-thiacarbocyanine hydroxide

FIG. 2

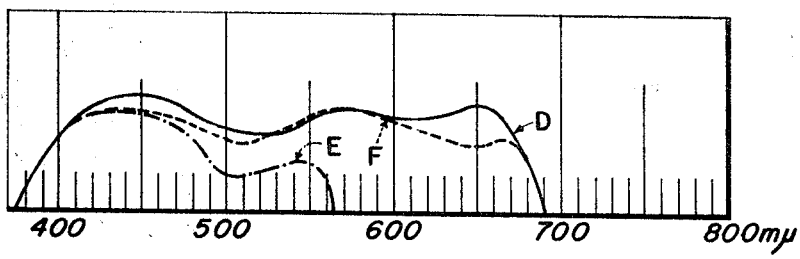

D- Anhydro-11-methyl-3,3'-bis-(ɣ-sulfopropyl)-
 naphtho-[1,2-d]-thiacarbocyanine hydroxide plus
 9-ethyl-3,3'-dimethyl-5,5'-dichloro-benzoxacarbocyanine
 bromide
E- 9-ethyl-3,3'-dimethyl-5,5'-dichloro-benzoxacarbo-
 cyanine bromide
F- Anhydro-11-methyl-3,3'-bis-(ɣ-sulfopropyl)-
 naphtho-[1,2-d] thiacarbocyanine hydroxide INVENTOR.
Vivian K. Walworth
BY
Brown and Mikulka
ATTORNEYS

United States Patent Office 3,459,553
Patented Aug. 5, 1969

3,459,553
PHOTOSENSITIVE ELEMENTS
Vivian K. Walworth, Concord, Mass., assignor to Polaroid Corporation, Cambridge, Mass., a corporation of Delaware
Filed Oct. 11, 1965, Ser. No. 494,383
Int. Cl. G03c 1/28
U.S. Cl. 96—104
11 Claims

ABSTRACT OF THE DISCLOSURE

A photographic emulsion's spectral response characteristics may be extended by incorporating therein a supersensitizing combination of cyanine dyes comprising a carbocyanine dye of the formula:

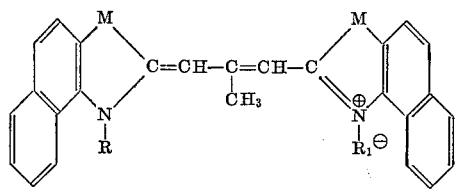

wherein M is selected from the group consisting of sulfur and selenium atoms; and R and $R_1$ are each a sulfoalkyl group; and a carbocyanine dye of the formula:

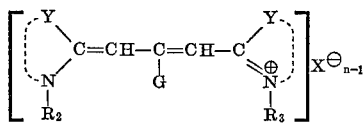

wherein G is selected from the group consisting of a hydrogen atom, a methyl group and an ethyl group; $R_2$ and $R_3$ are each an alkyl group; each Y represents the atoms necessary to complete a heterocyclic ring system of the benzoxazole series; X represents an anion; and $n$ is an integer from 1 to 2.

---

This invention deals with photography and, more particularly, with spectral sensitization of photosensitive silver halide emulsions.

It is the primary object of this invention to provide photographic silver halide emulsions which have been supersensitized with the novel combination of cyanine dyes set forth hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURES 1 and 2 are graphic illustrations of spectral sensitivity curves reproduced from wedge spectrographs of gelatino-silver iodobromide emulsions sensitized with the various identified carbocyanine dyes as set forth hereinafter.

Those skilled in the photographic art are aware that the photoresponse of an ordinary silver halide emulsior is generally limited to the blue and violet regions of the visible spectrum. However, it has been found that the addition of certain dyes to a silver halide emulsion extends the resulting emulsion's photoresponse approximately to the spectral regions absorbed by said dyes, when adsorbed onto silver halide. Thus a silver halide emulsion can be made sensitive to the green and red regions of the spectrum by incorporation, respectively, of certain dyes therein. Among the dyes which have been utilized at one time or another as sensitizers are those selected from the acridine, zanthene, diphenylmethane, stilbene, thiazole, quinoline, sulfur, pyranine, azo, and the like classes of dyes; these sensitizing dyes have been largely replaced, however, by the class of cyanine and related dyes, for example, the cyanine and merocyanine dyes. The cyanine dyes are those conforming to an amidinium ion system in which both nitrogen atoms are included in separate heterocyclic ring systems and in which the conjugated chain joining the nitrogen atoms passes through a part of each heterocyclic ring. The merocyanine dyes differ from the cyanine dyes in that they have a conjugated amide rather than a conjugated amidinium system.

Sensitizing dyes of the above types are normally distributed uniformly throughout a washed, finished emulsion in concentrations depending on the sensitometric characteristics of the particular emulsion and the effects desired.

It has been found that the magnitude of spectral sensitization of a silver halide crystal increases in accordance with an increase in the chemical-adsorption of the sensitizing dye on the surfaces of the crystal up to a concentration at which the conferred sensitivity reaches a plateau, specifically at a concentration range less than or equal to a statistical monomolecular layer dye coverage of the adsorbing surfaces of the crystal. Increasing the concentration of sensitizing dye beyond the plateau concentration provides a progressive decrease in spectral sensitivity; see F. M. Hamer, The Cyanine Dyes and Related Compounds, Interscience Publishers, New York, N.Y., 1964, and A. V. Borin, Investigation of the Concentration Effect in Optical Sensitization of Photographic Emulsions, Uspekhi, Nauch, Fab. Akad. SSSR, Otdel. Khim. Nauk. 7, 183–190 (1960). Common photographic practice is to incorporate the dye at that concentration producing the maximum sensitization. Sensitizing dyes are normally incorporated into the silver halide emulsion in the following manner. A quantity of dye is dissolved in a low molecular weight organic solvent such as methanol, acetone, or pyridine. A volume of the solution thus prepared, generally containing from 1 to 200 mg. of dye, is slowly added with stirring to about 1000 cc. of ordinary flowable silver halide emulsion until said dye is thoroughly dispersed in the emulsion. The sensitized emulsion thus prepared is coated, exposed, and developed according to usual photographic techniques.

It has been known since the late 1920's that the effect of incorporating two or more sensitizing dyes in a silver halide emulsion is not always the simple sum of their respective sensitizing effects. Sometimes the sensitization produced is unusual in that the magnitude thereof is greater than the sum of that produced by the individual dyes and/or the combination of dyes sensitizes at a wavelength at which neither of the dyes individually sensitizes. Combinations of dyes or a dye and a non-dye adjunct which give this additional sensitivity are called supersensitizing combinations.

The combination of two or more dyes or a dye and a non-dye adjunct to give a supersensitizing effect appears to be a specific phenomenon having a low element of predictability. Specific combinations which have been found to give supersensitization with certain cyanine dyes include merocyanines, as in U.S. Patents Nos. 2,977,229; 2,972,539; 2,652,330; and 2,430,558; benzimidazoles as in U.S. Patents Nos. 2,973,264; 2,945,763; 2,751,298; 2,701,198; and 2,566,167; triazines as in U.S. Patent No. 2,875,058; pyridine bases as in U.S. Patents Nos. 2,860,982; 2,860,981; and 2,478,369; styryl compounds as in U.S. Patents Nos. 2,533,426; 2,316,268; 2,313,922; and 2,075,047; and metallic salts as in U.S. Patents Nos. 2,816,029; 2,819,964; and 2,843,490.

It has now been unexpectedly discovered that employment of a specific, limited class of β-naphthothia- and β-naphthoselenacarbocyanine dyes in combination with a specific, limited classed of oxacarbocyanine dyes, both of which classes are detailed hereinafter, to effect sensitization of a silver halide emulsion provides supersensitization.

The β-naphthothia- and β-naphthoselenacarbocyanine dyes useful in the practice of the present invention may be represented by the formula:

(I) 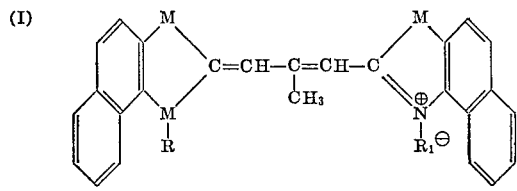

wherein M is a sulfur or selenium atom; and R and $R_1$ may be the same or different and are each a sulfo (lower) alkyl group, preferably containing from 1 to 4 carbon atoms, inclusive, such as a sulfomethyl, β-sulfoethyl, γ-sulfopropyl, γ-sulfobutyl, δ-sulfobutyl, and the like.

The oxacarbocyanine dyes useful in the practice of the present invention may be represented by the formula:

(II) 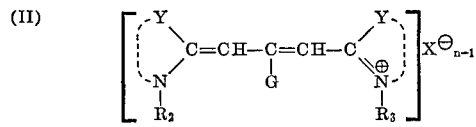

wherein G is a hydrogen atom, a methyl group, or an ethyl group; $R_2$ and $R_3$ may be the same or different and are each an alkyl group such as methyl, ethyl, n-propyl, isopropyl, isobutyl, n-butyl, β-methoxyethyl, β-ethoxyethyl, hydroxymethyl, β-hydroxyethyl, γ-hydroxypropyl, carboxymethyl, α-carboxyethyl, β-carboxyethyl, γ-carboxypropyl, γ-carboxybutyl, δ-carboxybutyl, sulfomethyl, α-sulfoethyl, β-sulfoethyl, γ-sulfopropyl, γ-sulfobutyl, δ-sulfobutyl, and the like, preferably a lower alkyl group containing from 1 to 4 carbon atoms, inclusive; each Y represents the atoms necessary to complete a heterocyclic ring system of the benzoxazole series; X represents an anion; and n is an integer from 1 to 2.

The designated heterocyclic axazole ring system may optionally contain those substituents usual in the cyanine dye art, for example, substituents such as lower alkyl; lower alkoxy, benzyl, phenyl, naphthyl, chloro, fluoro, iodo, bromo, amino, quaternary ammonium, hydroxyl, cyano, nitro, carboxy, fused benzene ring, and the like. As examples of such substituted benzoxazole ring systems, mention may be made of 5 - methylbenzoxazole, 5-chlorobenzoxazole, 5 - bromobenzoxazole, 5 - methoxybenzoxazole, 5 - ethoxybenzoxazole, 5-phenylbenoxazole, β-naphthoxazole, and the like.

The anion, represented by the designation X in Formula II, comprises those anionic acid radicals customarily used in the cyanine dye art, for example, chloride, bromide, iodide, methylsulfate, ethyl sulfate, p-toluenesulfonate, benzenesulfonate, acetate, propionate, cyanate, perchlorate, etc.

Dyes of Formula I, above, can advantageously be prepared according to the techniques described in U.S. Patent No. 3,177,120 of A. Rosenoff. Preparation of dyes of Formula II, above, is described in Chapter VI of F. M. Hamer, The Cyanine Dyes and Related Compounds, supra; and the preparation of specific oxacarbocyanine dyes is also disclosed in U.S. Patents Nos. 2,213,995; 2,238,231, and the like.

As illustrative examples of dyes of Formula I, mention may be made of:

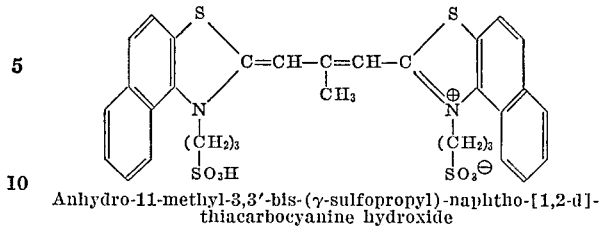

Anhydro-11-methyl-3,3'-bis-(γ-sulfopropyl)-naphtho-[1,2-d]-thiacarbocyanine hydroxide

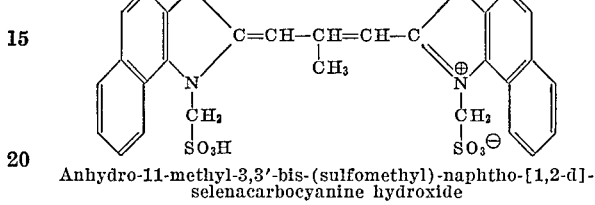

Anhydro-11-methyl-3,3'-bis-(sulfomethyl)-naphtho-[1,2-d]-selenacarbocyanine hydroxide As illustrative examples of dyes of Formula II, mention may be made of:

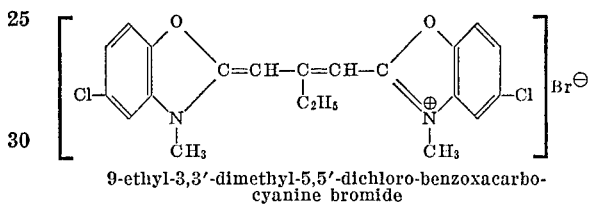

9-ethyl-3,3'-dimethyl-5,5'-dichloro-benzoxacarbocyanine bromide

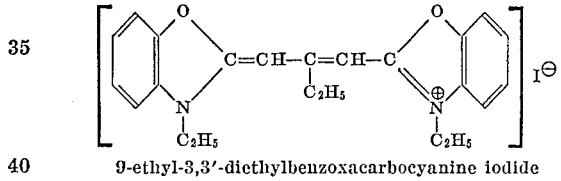

9-ethyl-3,3'-diethylbenzoxacarbocyanine iodide

III 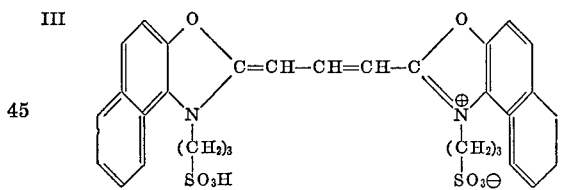

Anhydro-3,3'-bis-(γ-sulfopropyl)-naphtho-[1,2-d]-oxacarbocyanine hydroxide

Preferred dyes within Formula II are those represented by the following two general formulae:

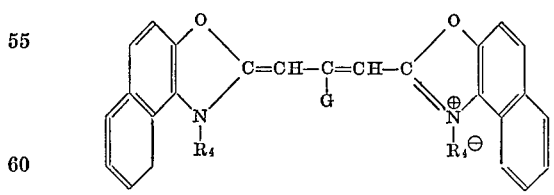

wherein G possesses the same significance as detailed above and each $R_4$ is a sulfo (lower) alkyl group comprising from 1 to 4 carbon atoms, inclusive; and IV 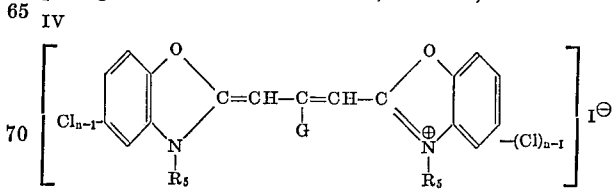

wherein G possesses the same significance as detailed above; n is an integer from 1 to 2; each $R_5$ is a methyl or ethyl group; and X is an anion.

In this invention one or more of the cyanine dyes represented by Formula I together with one or more of the cyanine dyes represented by Formula II are incorporated into a silver halide emulsion. The technique of incorporating said dye combination into the silver halide emulsion is substantially similar to that previously outlined with reference to the use of a single sensitizing dye. Each of the dyes is dissolved in a suitable solvent, such as methanol or pyridine, and appropriate amounts of each solvent containing the sensitizing dyes are slowly added to a liter or so of flowable silver halide emulsion and stirred or otherwise agitated until said dyes are uniformly dispersed throughout the solution. Alternatively, the solutions containing the dyes may be combined before addition to the silver halide emulsion or a single solution of the dyes employed.

The concentrations of the sensitizing dyes employed may be varied according to the characteristics of the particular silver halide emulsion and the sensitizing effect desired as is well known to those skilled in the photographic art. Ordinarily the preferred concentration of the $\beta$-naphthothia-or-$\beta$-naphthoselena-carbocyanine dyes used in this invention has been found to be from about 0.05 to 1 g. per 100 g. of silver. The optimum concentration of oxacarbocyanine dye used in combination therewith has been found to be from about 0.05 to 1 g. per 100 g. of silver. Of course the optimum concentration of the combination of cyanine dyes of this invention can be changed by varying the amount of one dye relative to the amount of the other. It has been experimentally determined that, in general, for conventional gelatino silver halide emulsion formulations, preferred weight ratios of $\beta$-naphthothia-or-$\beta$-naphthoselena-carboyanine dye to oxacarbocyanine dye vary from 1:5 to 2:1. Clearly, however, this invention is directed to any emulsion containing a combination of the above-mentioned cyanine dyes whereby the supersensitizing effect is obtained.

Additional optional additives, such as coating aids, hardeners, viscosity-increasing agents, stabilizers, preservatives, and the like, for example, those set forth hereinafter, also may be incorporated in the emulsion formulation, according to the conventional procedures known in the photographic emulsion manufacturing art.

The photoresponsive material of the photographic emulsion will comprise a crystal of silver, for example, one or more of the silver halides such as silver chloride, silver iodide, silver bromide, or mixed silver halides such as silver chlorobromide or silver iodobromide, of varying halide ratios and varying silver concentrations.

The emulsions may include the various adjuncts, or addenda, according to the techniques disclosed in the art, such as speed-increasing compounds of the quaternary ammonium type, as described in U.S. Patents Nos. 2,271,623; 2,288,266; and 2,334,864; or of the polyethyleneglycol type, as described in U.S. Patent No. 2,708,162; or of the preceding combination, as described in U.S. Patent No. 2,886,437; or the thiopolymers, as described in U.S. Patents Nos. 3,046,129 and 3,046,134.

The emulsions may also be stabilized with the salts of the noble metals such as ruthenium, rhodium, palladium, iridium and platinum, as described in U.S. Patents Nos. 2,566,245 and 2,566,263; the mercury compounds of U.S. Patents Nos. 2,728,663; 2,728,664; and 2,728,665; the triazoles of U.S. Patent No. 2,444,608; the azaindenes of U.S. Patents Nos. 2,444,605; 2,444,606; 2,444,607; 2,450,397; 2,444,609; 2,713,541; 2,743,181; 2,716,062; 2,735,769; 2,756,147; 2,772,164; and those disclosed by Birr in Z. wiss. Phot., volume 47, 1952, pages 2–28; the disulfides of Belgian Patent No. 569,317; the benzothiazolium compounds of U.S. Patents Nos. 2,131,038 and 2,694,716; the zinc and cadmium salts of U.S. Patent No. 2,839,405; and the mercapto compounds of U.S. Patent No. 2,819,965.

Hardening agents such as inorganic agents providing polyvalent metallic atoms, specifically polyvalent aluminum or chromium ions, for example, potash alum $$[K_2Al_2(SO_4)_4 \cdot 24H_2O]$$

and chrome alum $[K_2Cr_2(SO_4)_4 \cdot 24H_2O]$ and inorganic agents of the aldehyde type, such as formaldehyde, glyoxal, mucochloric acid, etc.; the ketone type such as diacetyl; the quinone type; and the specific agents described in U.S. Patents Nos. 2,080,019; 2,725,294; 2,725,295; 2,725,305; 2,726,162; 2,732,316; 2,950,197; and 2,870,013, may be incorporated, where desired, in the selected coating solution compositions.

Coating solution compositions employed to fabricate the respective strata of the film unit may contain one or more coating aids such as saponin; a polyethyleneglycol of U.S. Patent No. 2,831,766; a polyethyleneglycol ether of U.S. Patent No. 2,719,087; a taurine of U.S. Patent No. 2,739,891; a maleopimarate of U.S. Patent No. 2,823,123; an amino acid of U.S. Patent No. 3,038,804; a sulfosuccinamate of U.S. Patent No. 2,992,108; or a polyether of U.S. Patent No. 2,600,831; or a gelatin plasticizer such as glycerin; a dihydroxyalkane of U.S. Patent No. 2,960,404; a bis-glycolic acid ester of U.S. Patent No. 2,904,434; and succinate of U.S. Patent No. 2,940,854; or a polymeric hydrosol of U.S. Patent No. 2,852,386.

As the binder for the respective emulsion strata, the aforementioned gelatin may be, in whole or in part, replaced with some other colloidal material such as albumin; casein; or zein; or resins such as a cellulose derivative, as described in U.S. Patents Nos. 2,322,085 and 2,327,808; polyacrylamides, as described in U.S. Patent No. 2,541,474; vinyl polymers such as described in U.S. Patents Nos. 2,253,078; 2,678,884; 2,691,582; 2,725,296; 2,753,264; and the like.

The method of practicing this invention will be further illustrated by the following specific examples which are intended to be illustrative only and not of limiting effect.

Example 1

Emulsion A.—To 8.6 grams of a photosensitive silver iodobromide emulsion, containing approximately 13 weight percent silver, was slowly added 2.0 ml. of a 1% solution of anhydro-11-methyl-3,3'-bis($\gamma$ - sulfopropyl)-naphtho-[1,2-d]-thiaacarbocyanine hydroxide in methanol, 1.5 ml. of a 1% solution of anhydro-3,3'-bis-($\gamma$-sulfopropyl)-naphthio-[1,2-d]-oxacarbocyanine hydroxide in methanol, 2.5 ml. of water, and .25 ml. of a 1% sodium dioctyl sulfosuccinate solution. The resulting mixture was then agitated for 10 minutes.

Emulsion B.—A photosensitive emulsion was prepared exactly as Emulsion A except that no anhydro-11-methyl-3,3' - bis($\gamma$ - sulfopropyl)-naphtho-[1,2-d]-thiacarbocyanine hydroxide was added.

Emulsion C.—A photosensitive emulsion was prepared exactly as Emulsion A except that no anhydro-3,3'-bis-($\gamma$-sulfopropyl)-naphtho - [1,2-d] - oxacarbocyanine hydroxide was added.

The photosensitive emulsions thus prepared were coated onto a transparent film base, and exposed in a wedge spectrograph. A graphic illustration of the spectrograms is shown in FIGURE 1. Curve C shows the sensitivity conferred on the silver halide emulsion by anhydro-11-methyl-3,3'-bis-($\gamma$-sulfopropyl)-naphtho - [1,2-d] - thiacarbocyanine hydroxide alone. Curve B illustrates the sensitivity of a silver halide emulsion containing only anhydro-3,3' - bis-($\gamma$ - sulfopropyl)-naphtho-[1,2-d]-oxacarbocyanine hydroxide. Curve A shows the supersensitizing effect obtained in Emulsion A by the combination of sensitizing dyes used in Emulsions B and C.

Example 2

Emulsion D.—To 14.4 grams of a photosensitive silver iodobromide emulsion, containing approximately 13 weight percent silver, was slowly added 2.0 ml. of a 1% solution of anhydro - 11 - methyl-3,3'-bis-($\gamma$-sulfopropyl)- naphtho-[1,2-d]-thiacarbocyanine hydroxide in methanol, 1.5 ml. of a 1% solution of 9-ethyl-3,3′-dimethyl-5,5′-dichlorobenzoxacarbocyanine bromide in methanol, 9.2 ml. of water, and 2.4 ml. of a 1% sodium dioctyl sulfosuccinate solution. The resulting mixture was then agitated for 10 minutes.

Emulsion E.—A photosensitive emulsion was prepared exactly as Emulsion D except that no anhydro-11-methyl-3,3′-bis-(γ-sulfopropyl)-naphtho-[1,2-d]-thiacarbocyanine hydroxide was added.

Emulsion F.—A photosensitive emulsion was prepared exactly as Emulsion D except that no 9-ethyl-3,3′-dimethyl - 5,5′ - dichloro-benzoxacarbocyanine bromide was added.

The photosensitive emulsions thus prepared were coated onto standard photographic supports, and exposed in a wedge spectrograph. A graphic illustration of the resulting spectrograms is shown in FIG. 2. Curve F shows the sensitivity conferred on the silver halide emulsion by anhydro - 11 - methyl - 3,3′ - bis-(γ-sulfopropyl)-naphtho-[1,2-d]-thiacarbocyanine hydroxide. Curve E illustrates the sensitivity of a silver halide emulsion containing only 9 - ethyl - 3,3′ - dimethyl - 5,5′ - dichloro-benzoxacarbocyanine bromide. Curve D shows the supersensitizing effect obtained in Emulsion D by the combination of sensitizing dyes used in Emulsions E and F. As illustrated in the drawing, it will be noted that, in both Examples 1 and 2, the combinations of dyes detailed supersensitize in the region of the spectrum between about 550 and 700 mμ, and it will be further noted that the oxacarbocyanine dyes employed do not sensitize in the spectral region beyond about 570 mμ, when employed alone.

The preceding examples were repeated employing, in combination with anhydro - 11 - methyl-3,3′-bis-(γ-sulfopropyl) - naphtho - [1,2-d] - thiacarbocyanine hydroxide, 9 - ethyl - 3,3′ - diethyl - 5,5′ - dichloro-benzoxacarbocyanine bromide; 9-ethyl-3,3′-diethylbenzoxacarbocyanine iodide; 9 - methyl - 3,3′ - dimethylbenzoxacarbocyanine iodide; anhydro - 11 - ethyl - 3,3′ - bis-(γ-sulfopropyl)-naphtho-[1,2-d]-oxacarbocyanine hydroxide; and anhydro - 11 - methyl - 3,3′ - bis-(γ-sulfopropyl)-naphtho-[1,2-d]-oxacarbocyanine hydroxide, respectively; these further experiments substantiated and further confirmed the supersensitizing effect illustrated in the drawings with respect to Examples 1 and 2.

Since certain changes can be made in the above product without departing from the scope of the invention herein involved, it is intended that all matter contained in the above description shall be interpreted as illustrative and not in a limiting sense.

What is claimed is:
1. A photographic silver halide emulsion having incorporated therein a supersensitizing combination of cyanine dyes comprising a carbocyanine dye of the formula:

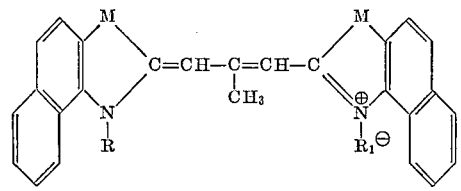

wherein M is selected from the group consisting of sulfur and selenium atoms; and R and $R_1$ are each a sulfo (lower) alkyl group; and a carbocyanine dye of the formula:

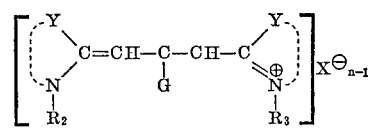

wherein G is selected from the group consisting of a hydrogen atom, a methyl group and an ethyl group; $R_2$ and $R_3$ are each an alkyl group; each Y represents the atoms necessary to complete a heterocyclic ring system of the benzoxazole series; X represents an anion; and $n$ is an integer from 1 to 2.

2. A photographic silver halide emulsion as defined in claim 1 wherein said silver halide is silver iodobromide.

3. A photographic silver halide emulsion having incorporated therein a supersensitizing combination of cyanine dyes comprising a carbocyanine dye of the formula:

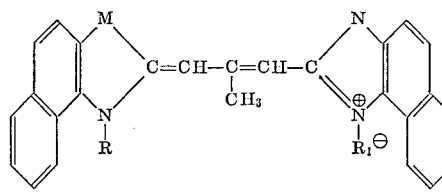

wherein M is selected from the group consisting of sulfur and selenium atoms; and R and $R_1$ are each a sulfoalkyl group comprising from one to four carbon atoms, inclusive; and a carbocyanine dye of the formula;

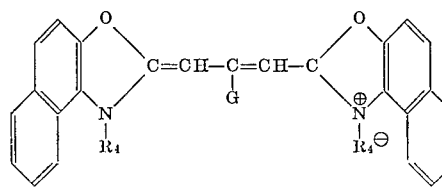

wherein G is selected from the group consisting of a hydrogen atom, a methyl group, and an ethyl group; and each $R_4$ is a sulfoalkyl group comprising from one to four carbon atoms, inclusive.

4. A photographic silver halide emulsion having incorporated therein a supersensitizing combination of anhydro - 11 - methyl - 3,3′ - bis-(γ-sulfopropyl)-naphtho-[1,2-d]-thiacarbocyanine hydroxide and anhydro-3,3′-bis-(γ-sulfopropyl) - naphtho - [1,2-d] - oxacarbocyanine hydroxide.

5. A photographic silver halide emulsion having incorporated therein a supersensitizing combination of anhydro - 11 - methyl - 3,3′ - bis-(γ-sulfopropyl)-naphtho-[1,2-d]-thiacarbocyanine hydroxide and anhydro-11-methyl - 3,3′ - bis-(γ-sulfopropyl)-naphtho-[1,2-d]-oxacarbocyanine hydroxide.

6. A photographic silver halide emulsion having incorporated therein a supersensitizing combination of anhydro - 11 - methyl - 3,3′ - bis-(γ-sulfopropyl)-naphtho-[1,2-d]-thiacarbocyanine hydroxide and anhydro-11-ethyl-3,3′ - bis-(γ-sulfopropyl)-naphtho - [1,2-d] - oxacarbocyanine hydroxide.

7. A photographic silver halide emulsion having incorporated therein a supersensitizing combination of cyanine dyes comprising a carbocyanine dye of the formula:

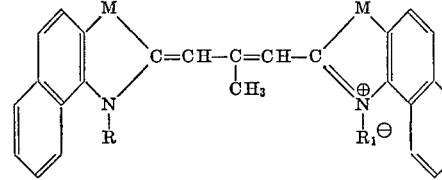

wherein M is selected from the group consisting of sulfur and selenium atoms, and R and $R_1$ are each a sulfoalkyl group containing from one to four carbon atoms, inclusive; and a carbocyanine dye of the formula:

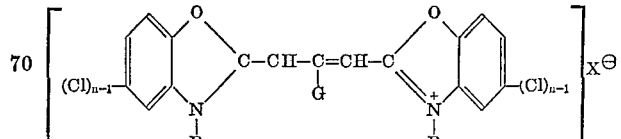

wherein G is selected from the group consisting of a hydrogen atom, a methyl group and an ethyl group; $n$ is an integer from 1 to 2; each $R_5$ is selected from the group consisting of a methyl and an ethyl group; and X is at anion.

8. A photographic silver halide emulsion having incorporated therein a supersensitizing combination of anhydro - 11 - methyl - 3,3' - bis-($\gamma$-sulfopropyl)-naphtho-[1,2-d]-thiacarbocyanine hydroxide and 9-ethyl-3,3'-dimethyl-5,5'-dichloro-benzoxacarbocyanine bromide.

9. A photographic silver halide emulsion having incorporated therein a supersensitizing combination of anhydro - 11 - methyl - 3,3' - bis-($\gamma$-sulfopropyl)-naphtho-[1,2-d]-thiacarbocyanine hydroxide and 9-ethyl-3,3'-diethyl-benzoxacarbocyanine iodide.

10. A photographic silver halide emulsion having incorporated therein a supersensitizing combination of anhydro - 11 - methyl - 3,3' - bis-($\gamma$-sulfopropyl)-naphtho-[1,2-d]-thiacarbocyanine hydroxide and 9-ethyl-3,3'-diethyl-5,5'-dichloro-benzoxacarbocyanine bromide.

11. A photographic silver halide emulsion having incorporated therein a supersensitizing combination of anhydro - 11 - methyl - 3,3' - bis-($\gamma$-sulfopropyl)-naphtho-[1,2-d]-thiacarbocyanine hydroxide and 9-methyl-3,3'-dimethyl-benzoxacarbocyanine iodide.

References Cited

UNITED STATES PATENTS 3,338,714  8/1967  Ficker et al. _____ 96—104

FOREIGN PATENTS 734,370  5/1966  Canada.

NORMAN G. TORCHIN, Primary Examiner

JACK P. BRAMMER, Assistant Examiner

UNITED STATES PATENT OFFICE
CERTIFICATE OF CORRECTION

Patent No. 3,459,553          Dated August 5, 1969

Inventor(s) Vivian K. Walworth

It is certified that error appears in the above-identified patent and that said Letters Patent are hereby corrected as shown below:

Column 7, claim 1, line 70 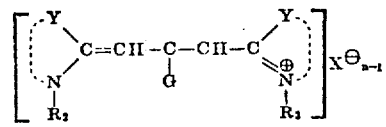

should be 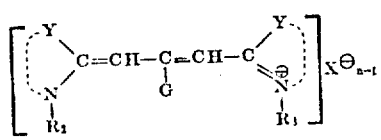

Column 8, claim 3, line 25 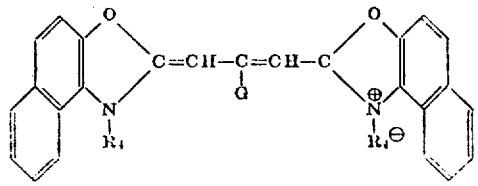

should be 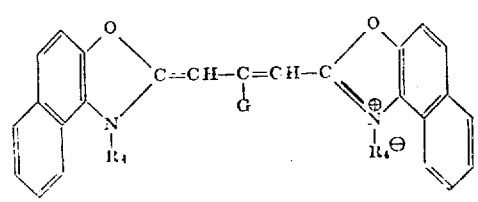

Column 8, claim 7, line 70 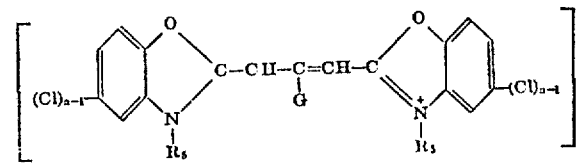

should be 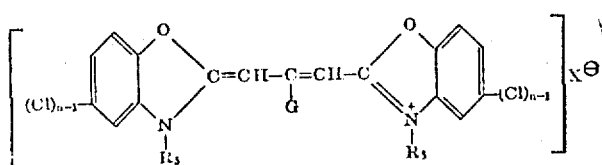

Column 9, claim 7, line 3, "at" should be --an--.

Signed and sealed this 20th day of June 1972.

(SEAL)
Attest:

EDWARD M. FLETCHER, JR.
Attesting Officer

ROBERT GOTTSCHALK
Commissioner of Patents